(12) United States Patent
Kozyrczak et al.

(10) Patent No.: US 8,775,471 B1
(45) Date of Patent: Jul. 8, 2014

(54) REPRESENTING USER BEHAVIOR INFORMATION

(75) Inventors: Maciek Kozyrczak, Bothell, WA (US); Cheng Che Chen, Bellevue, WA (US); Basem Nayfeh, Mercer Island, WA (US)

(73) Assignee: AudienceScience Inc., Bellevue, WA (US)

( * ) Notice: Subject to any disclaimer, the term of this patent is extended or adjusted under 35 U.S.C. 154(b) by 0 days.

(21) Appl. No.: 13/541,660

(22) Filed: Jul. 3, 2012

Related U.S. Application Data (63) Continuation of application No. 12/874,090, filed on Sep. 1, 2010, now abandoned, which is a continuation of application No. 11/294,756, filed on Dec. 6, 2005, now Pat. No. 7,809,752, which is a continuation of application No. 11/107,409, filed on Apr. 14, 2005, now abandoned.

(51) Int. Cl.
*G06F 17/30* (2006.01)

(52) U.S. Cl.
USPC .......................................... 707/790; 707/748

(58) Field of Classification Search
None
See application file for complete search history.

(56) References Cited

U.S. PATENT DOCUMENTS

| | | |
|---|---|---|
| 5,530,939 A | 6/1996 | Mansfield, Jr et al. |
| 5,721,831 A | 2/1998 | Waits et al. |
| 5,742,806 A | 4/1998 | Reiner et al. |
| 5,870,746 A | 2/1999 | Knutson et al. |
| 6,003,036 A | 12/1999 | Martin |
| 6,061,658 A | 5/2000 | Chou et al. |
| 6,078,891 A | 6/2000 | Riordan et al. |
| 6,112,186 A | 8/2000 | Bergh et al. |
| 6,272,472 B1 | 8/2001 | Danneels et al. |
| 6,374,263 B1 | 4/2002 | Bunger et al. |
| 6,377,993 B1 | 4/2002 | Brandt et al. |
| 6,430,539 B1 | 8/2002 | Lazarus et al. |
| 6,609,131 B1 | 8/2003 | Zait et al. |
| 6,615,258 B1 | 9/2003 | Barry et al. |
| 6,629,102 B1 | 9/2003 | Malloy et al. |
| 6,694,322 B2 | 2/2004 | Warren et al. |
| 6,785,666 B1 | 8/2004 | Nareddy et al. |
| 6,839,682 B1 | 1/2005 | Blume et al. |
| 6,862,574 B1 | 3/2005 | Srikant et al. |
| 6,873,981 B2 | 3/2005 | Nareddy et al. |
| 6,892,347 B1 | 5/2005 | Williams et al. |
| 6,917,972 B1 | 7/2005 | Basko et al. |
| 6,993,529 B1 | 1/2006 | Basko et al. |
| 7,003,476 B1 | 2/2006 | Samra et al. |
| 7,035,925 B1 | 4/2006 | Nareddy et al. |
| 7,039,699 B1 | 5/2006 | Narin et al. |
| 7,058,590 B2 | 6/2006 | Shan |
| 7,107,338 B1 | 9/2006 | Nareddy et al. |
| 7,117,193 B1 | 10/2006 | Basko et al. |

(Continued)

OTHER PUBLICATIONS

U.S. Appl. No. 10/870,688, Kumar et al.

(Continued)

*Primary Examiner* — Debbie Le
(74) *Attorney, Agent, or Firm* — Perkins Coie LLP (57) ABSTRACT

A facility for analyzing user behavior information is described. The facility receives a stream, of user behavior information. The facility augments a representation of user behavior in accordance with the received stream of user behavior information. The representation augmented by the facility is a sparse matrix of user behavior facts. The facility analyzes the sparse matrix to obtain an analysis result for the received stream of user behavior.

20 Claims, 6 Drawing Sheets

(56) References Cited

U.S. PATENT DOCUMENTS

| | | | |
|---|---|---|---|
| 7,120,666 B2 | 10/2006 | McCanne et al. |
| 7,165,037 B2 | 1/2007 | Lazarus et al. |
| 7,188,334 B1 | 3/2007 | Sinclair |
| 7,197,517 B2 | 3/2007 | Farrington et al. |
| 7,231,612 B1 | 6/2007 | Mani et al. |
| 7,246,083 B2 | 7/2007 | Bibelnieks et al. |
| 7,308,497 B2 | 12/2007 | Louviere et al. |
| 7,370,342 B2 | 5/2008 | Ismail et al. |
| 7,424,439 B1 | 9/2008 | Fayyad et al. |
| 7,464,122 B1 | 12/2008 | Basko et al. |
| 7,493,312 B2 | 2/2009 | Liu et al. |
| 7,676,467 B1 | 3/2010 | Kozyrczak et al. |
| 2002/0072971 A1 | 6/2002 | DeBusk et al. |
| 2002/0082901 A1 | 6/2002 | Dunning et al. |
| 2002/0095421 A1 | 7/2002 | Koskas |
| 2002/0099691 A1 | 7/2002 | Lore et al. |
| 2003/0014304 A1 | 1/2003 | Calvert et al. |
| 2003/0028509 A1 | 2/2003 | Sah et al. |
| 2003/0074348 A1 | 4/2003 | Sinclair et al. |
| 2003/0101451 A1 | 5/2003 | Bentolila et al. |
| 2003/0163438 A1 | 8/2003 | Barnett et al. |
| 2003/0204447 A1 | 10/2003 | Dalzell et al. |
| 2003/0216966 A1 | 11/2003 | Saenz et al. |
| 2004/0088212 A1 | 5/2004 | Hill |
| 2004/0088376 A1 | 5/2004 | McCanne et al. |
| 2004/0116783 A1 | 6/2004 | Weaver |
| 2004/0117239 A1 | 6/2004 | Mittal et al. |
| 2004/0172400 A1 | 9/2004 | Zarom et al. |
| 2004/0181554 A1 | 9/2004 | Heckerman et al. |
| 2004/0230947 A1 | 11/2004 | Bales et al. |
| 2005/0015571 A1 | 1/2005 | Kaufman et al. |
| 2005/0033771 A1 | 2/2005 | Schmitter et al. |
| 2005/0086243 A1 | 4/2005 | Abbott et al. |
| 2005/0159996 A1 | 7/2005 | Lazarus et al. |
| 2005/0203888 A1 | 9/2005 | Woosley et al. |
| 2005/0240468 A1 | 10/2005 | Inman et al. |
| 2006/0041548 A1 | 2/2006 | Parsons et al. |
| 2006/0069719 A1 | 3/2006 | McCanne et al. |
| 2006/0112073 A1* | 5/2006 | Jensen et al. ............ 707/2 |
| 2006/0112222 A1 | 5/2006 | Barrall |
| 2006/0143684 A1 | 6/2006 | Morris |
| 2006/0155605 A1 | 7/2006 | Haighton et al. |
| 2006/0190333 A1 | 8/2006 | Choi |
| 2006/0235764 A1 | 10/2006 | Bamborough et al. |
| 2006/0277585 A1 | 12/2006 | Error et al. |
| 2008/0097822 A1 | 4/2008 | Schigel et al. |
| 2008/0189232 A1 | 8/2008 | Dunning et al. |

OTHER PUBLICATIONS

U.S. Appl. No. 09/613,403, Tawakol et al.
U.S. Appl. No. 12/408,660, filed Feb. 7, 2012, Kumer et al.
U.S. Appl. No. 12/912,681, filed Oct. 26, 2010, Tawakol.
Dainow, Brandt, "Defining Unique Visitors," iMedia Connection, 2 pages, Dec. 1, 2005.
"H", Microsoft® Computer Dictionary, Fifth Edition, 21 pages, May 2002.
Maurer, W. D. et al., "Hash Table Methods," Computing Surveys, vol. 7, No. 1, pp. 5-19, Mar. 1975.
Novak, T. P. et al., "New Metrics For New Media: Toward the Development of Web Measurement Standards," World Wide Web Journal, vol. 2, No. 1, pp. 213-246, 1997.
ProQuest, "My Research," 5 pages, 2008.
Sen, Shahana et al., "On the Analysis of Web Site Usage Data: How Much Can We Learn About the Consumer From Web Logfiles?," Working Paper, 28 pages, 1998.
U.S. Appl. No. 10/870,688; Non-Final Office Action, 14 pages, Sep. 22, 2008.
Williamson, Debra Aho, "What Comes Before Search," The Wall Street Journal, 18 pages, Sep. 2004.
Wilson, R. Dale, "Using Web Traffic Analysis for Customer and Retention Programs in Marketing," Services Marketing Quarterly, vol. 26, No. 2, 23 pages, 2004.

\* cited by examiner

Conceptual View Table — 100

| user name \ action | request page in electronics category | use loan calculator | request breaking news page | perform shopping checkout |
|---|---|---|---|---|
| ned@hotmail.com — 101 | 4/4/05<br>5 occurrences | | | 4/1/05<br>1 occurrence |
| jean@yahoo.com — 102 | | | 3/23/05<br>2 occurrences | |
| art@aol.com — 103 | | 4/6/05<br>11 occurrences | | 4/6/05<br>1 occurrence |

| local user id | global user id |
|---|---|
| 0 | 585d6f9594efff3e43b12a3a5046e980 |
| 1 | 60efe225e5b6491763c9ff3dbac34ec0 |
| 2 | f60a7b6b9fd31454bec9123c69718cf2 | local user id table — 400
— 401
— 402
— 403
— 411  — 412

*FIG. 4*

| action id | action |
|---|---|
| 0 | request page in Electronics category |
| 1 | use loan calculator |
| 2 | request Breaking News page |
| 3 | perform shopping checkout | action id table — 500
— 501
— 502
— 503
— 504
— 511  — 512

REPRESENTING USER BEHAVIOR INFORMATION

CROSS REFERENCE TO RELATED APPLICATIONS

This application is a continuation of U.S. patent application Ser. No. 12/874,090, filed Sept. 1, 2010, which is a continuation of U.S. patent application Ser. No. 11/294,756, filed Dec. 6, 2005, which is a continuation of U.S. patent application Ser. No. 11/107,409, filed Apr. 14, 2005, all of which are hereby incorporated by reference herein in their entireties.

TECHNICAL FIELD

The described technology is directed to the field of processing and analyzing user behavior information.

BACKGROUND

It is common for the operators of a web site to analyze the behavior of users on the web site, such as to determine how to adapt the web site to the needs or interests of the visiting users, or to determine how to sell and present advertising on the web site. In some cases, web site operators request or permit a third party to do so on their behalf.

Such analysis typically begins with a source of raw data about user behavior, such as web logs produced by web servers that serve the web site, or web logs produced by web servers that monitor behavior on the web site by serving small image files that are referenced on the pages of the web site.

Unfortunately, such raw data is so unwieldy and disorganized as to be difficult and expensive to directly use for such analysis. While intermediate data structures are sometimes constructed from the raw data for use in the analysis, conventional intermediate data structures are similarly laborious to build and/or analyze.

In view of the foregoing, a representation of user behavior information that is efficient to generate and analyze would have significant utility.

DETAILED DESCRIPTION

A software facility for representing user behavior information ("the facility") is provided. In some embodiments, the facility constructs, maintains, stores, and/or analyzes a sparse matrix representation of user behavior information ("the representation").

The representation includes a fact table containing user behavior facts, such as a particular user's performance of a particular action with respect to a subject web site, such as using a loan calculator tool. In some embodiments, each fact identifies a particular action typo, a user performing an action of that type, a time interval during with the user performed an action of that type, and the number of times during that time interval that the user performed actions of that type.

The fact table is indexed in two or more dimensions, such as a user identity dimension and an action type dimension. For each indexed dimension, the representation includes an array having elements each corresponding to a different value of an indexed dimension. Each element contains a list of pointers to facts in the fact table relating to the indexed dimension. For example, for a user identity dimension, the array has an element for each different user identity. The element of the array for a particular user identity contains a list of pointers to facts in the fact table representing actions performed by the user.

The facility constructs and maintains the representation using user behavior information identifying actions performed by identified users. For each such action, the facility uses the index to determine whether the fact table already contains a fact for the action. If so, the facility augments the matching fact to reflect the action. Otherwise, the facility creates and indexes a new fact to reflect the action and Indexes new fact.

In order to analyze actions performed by an individual user, actions performed that are of a particular action type, or facts based upon a particular value of another indexed dimension, the facility retrieves the facts of the fact table pointed to by the list of pointers contained in the array element corresponding to that value in the array corresponding to that dimension.

By using a representation having some or all of the characteristics discussed above, the facility efficiently constructs, stores, maintains, and analyzes user behavior information. In particular, the facility facilitates common and desirable forms of analysis of user behavior information, including a variety of behavior correlating algorithms, including correlation based upon affinity, linear correlation, etc.

Figure 1:
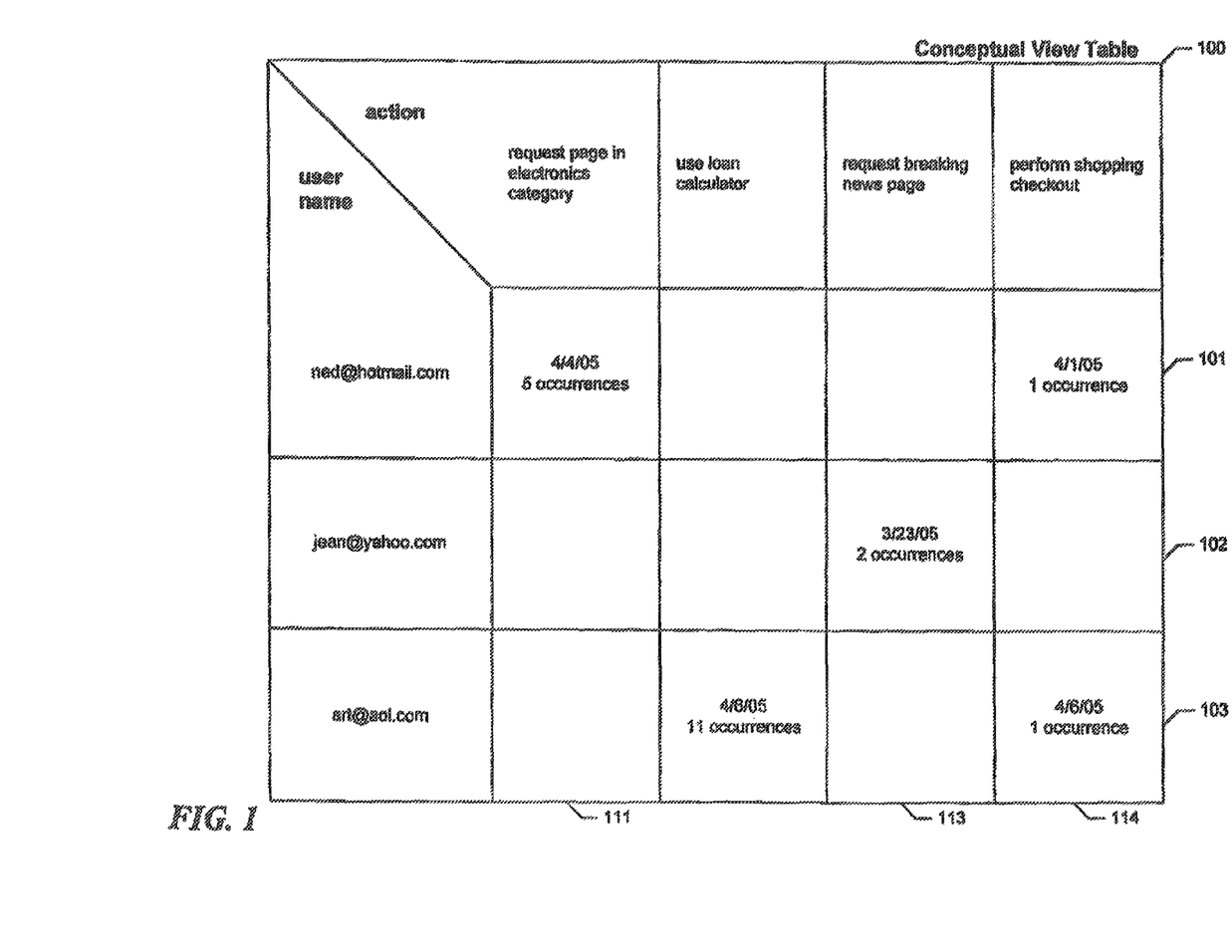
FIG. 1 is a table diagram showing a conceptual view of sample contents of a representation of user behavior information used by the facility in some embodiments.

FIG. 1 is a table diagram showing a conceptual view of sample contents of a representation of user behavior information used by the facility in some embodiments. The table 100 comprises a 2-dimensional grid in which the horizontal dimension is divided into different types of user behavior actions, while the vertical dimension is divided into different user identities. For example, row 101 contains all actions performed by a user identified by the email address "ned@hotmail.com". Column 111, on the other hand, contains information about all actions that constitute requesting a page in the subject website's Electronics category. The intersection of this row and this column shows that the "ned@hotmail.com" user performed five requests for pages in the Electronics category on Apr. 4, 2005. The empty spaces in column 111 at rows 102 and 103 indicates that neither the "jean©yahoo.com" user nor the "art©aol.com" user has requested a page in the Electronics category. Looking further at row 101, it can be seen that, in addition to requesting five pages in the Electronics category on Apr. 4, 2005, the "ned@hotmail.com" user also performed one shopping checkout action on Apr. 1, 2005.

The information analysis functionality provided by the facility can be understood with reference to the conceptual view shown in FIG. 1. For a particular action type, the facility enables its operator to efficiently collect all of the actions of a particular type—that is all of the actions appearing in a particular column. For example, the operator may analyze the contents of column 114 to identify all users that have performed at least one shopping checkout in the last two weeks in order to construct an advertising segment containing these users. As another example, the operator may use the facility to analyze the actions of a particular user. For example, the operator may use the facility to determine the set of actions performed by the "art©aol.com" user—that is, those shown in row 103. The operator may use the actions performed by this user to select an advertising message or a promotion to present to this user.

Figure 4:
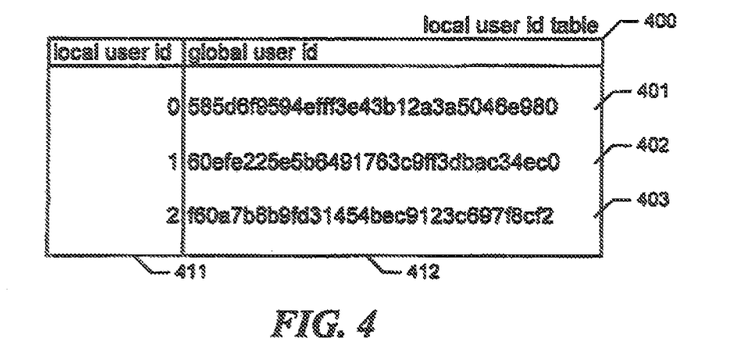
FIG. 4 is a table diagram showing sample contents of a local user ID table used by the facility to encode user identity.

While the conceptual view shown in FIG. 1 provides a useful basis for understanding the information represented by the facility, the particular data structures that the facility uses to make up its representation of this information have a different structure, described in detail below in connection with FIGS. 4-6.

Figure 2:
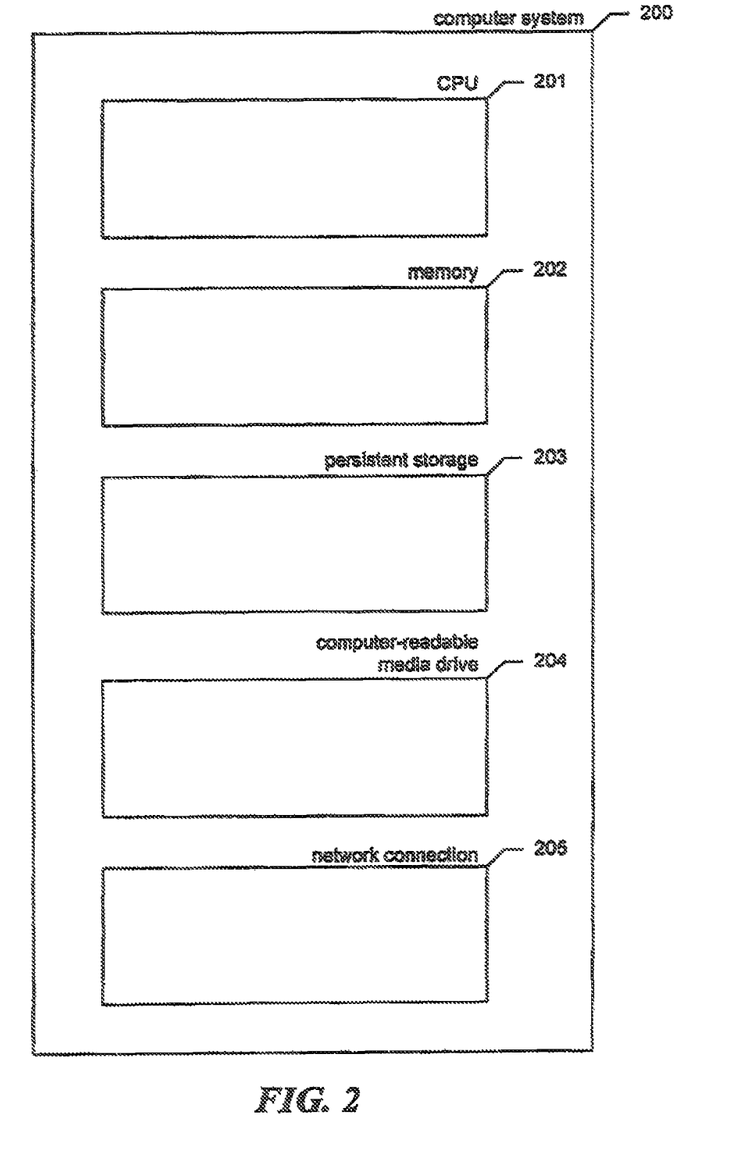
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
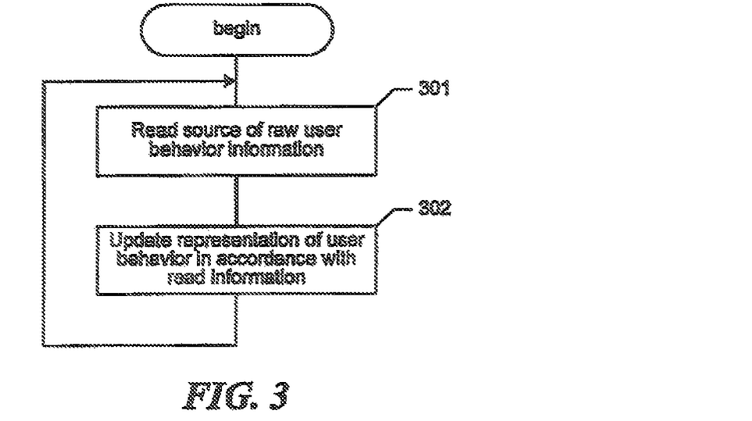
FIG. 3 is a flow diagram showing steps typically performed by the facility in order to construct and maintain its representation of user behavior.

FIG. 3 is a flow diagram showing steps typically performed by the facility in order to construct and maintain its representation of user behavior. In step 301, the facility reads raw user behavior information from an available source of raw user behavior information, such as a web server log or an information source abstracted from a web server log. In step 302, a facility updates the representation of user behavior in accordance with information read in step 301. This updating is discussed further below in connection with FIGS. 4-6. After step 302, the facility continues in step 301 to read additional raw user behavior information. When the facility receives raw user behavior information, it typically receives information of each of a number of different actions performed by users. In each case, the raw information typically includes information identifying a user, such as an email address used by the user, a user name used by the user when visiting the subject web site, the contents of a user identifier cookie stored by the user's browser, the IP address of the user's computer system, etc.; indication identifying the type of action, such as contents of one or more fields of a web log entry corresponding to the action, or a characterization of the action derived from processing a web log. Information about an action may also include the date and/or time at which the action was performed. As examples, the facility may receive raw user behavior information in ways and/or from sources described in the following two patent applications, each of which is hereby incorporated by reference in its entirety: U.S. patent application Ser. No. 10/859,442, filed on Jun. 1, 2004, and U.S. patent application Ser. No. 11/048,985, filed on Feb. 1, 2005.

When the facility receives this information for a particular action, accesses a pair of tables to determine how to encode this information in the representation. FIG. 4 is a table diagram showing sample contents of a local user ID table used by the facility to encode user identity. In order to use the local user ID table, the facility subjects identifying information for the user to a hashing function, such as the MD 5 hashing algorithm defined in R. Rivest, Network Working Group Request for Comments 1321, "The MD5 Message-Digest Algorithm," published Apr., 1992, available at http://www.letf.org/rfc/rfc1321.txt. After subjecting the user identifying information to the hashing algorithm, the facility compares the hash result to hash results contained in the global user ID column 412 of the local user ID table. If the hash result produced by the hashing algorithm matches any of these global user IDs, the facility uses the local user ID contained in the local user ID column 411 of the local user ID table from the same row of the local user ID table. For example, if the information received by the facility indicates that the action was performed by a user having user identifying information "ned@hotmail.com", the facility applies the hashing algorithm to obtain the global user ID "585d6f959efff3e43b12a3a504e980", the facility matches this with the global user ID of row 401, and determines that the user performing the action has local user ID 0. If the global user ID produced by the hashing function does not match any of the global user IDs in the local user ID table, the facility adds a new row to the local user ID table containing that hash result and an unused local user ID value, such as the next-larger local user ID value. In this case, the facility uses the local user ID from this added row.

Figure 5:
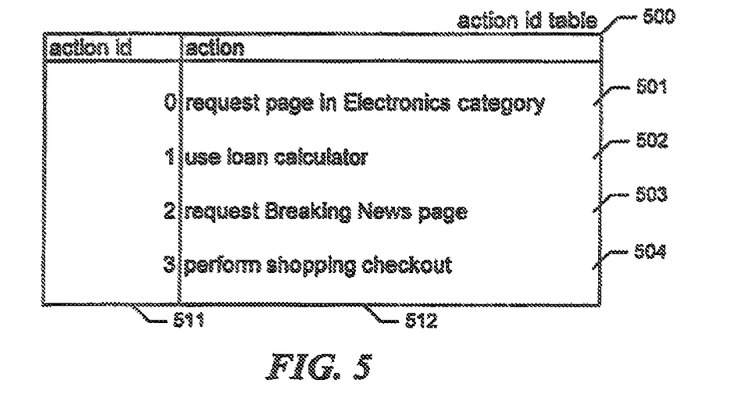
FIG. 5 is a table diagram showing sample contents of an action ID table used by the facility.

FIG. 5 is a table diagram showing sample contents of an action ID table used by the facility. The facility attempts to look up an action ID for the action type contained in the information received by the facility. If the action type is already contained In the action column 512 of table 500, then the facility uses the action ID appearing in the action ID column 511 of the same row of the action ID table. If the action type does not appear in the action ID table, the facility adds a row to the action ID table containing the action type and an unused action ID. In some embodiments, the contents of the action column are in a less human-readable form, such as strings matching actual contents of a web server log entry corresponding to an action of the type. In some embodiments, the facility stores action IDs in the action ID table in connection with a hashed version of their action type as described above for global user IDs, rather than in connection with the action type itself.

After determining a local user ID and an action ID for a new action, the facility uses these two identifiers to access its representation Of user behavior information. By using these identifiers inside the representation, rather than the larger corresponding values contained in the incoming raw behavior information, the facility is able to conserve space within the representation.

Figure 6:
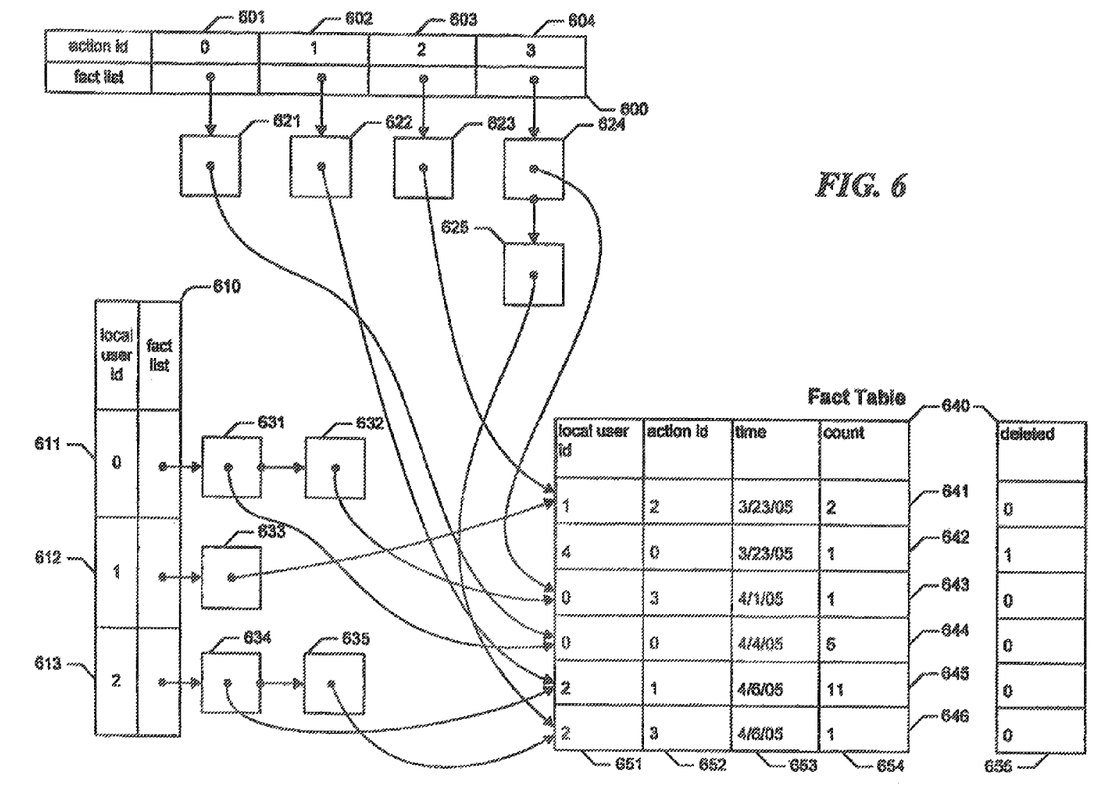
FIG. 6 is a data structure diagram showing sample contents of the facility's representation of user behavior information.

FIG. 6 is a data structure diagram showing sample contents of the facility's representation of user behavior information. The representation contains an index 600 on the action-type dimension, as well as an index 610 on the user identity dimension. The index 600 of the action type dimension is a 1-dimensional array. Each element of the array corresponds to a different action ID. For example, element 604 of the array corresponds to the action ID 3. Each element of the array points to a list of fact pointers. In some embodiments, the facility stores each list of fact pointers as a linked list in some embodiments, the facility stores each list of fact pointers as a single contiguous vector. In some embodiments, the facility stores each list of fact pointers as a series of chunked arrays collectively representing a contiguous vector. For example, element 604 points to a fist of fact pointers containing fact pointer 624 and fact pointer 625. Each of the fact pointers on the list points to a fact stored in one row of a fact table 640. For example, fact pointer 624 points to the fact contained in row 643 of the fact table, while fact pointer 625 points to a fact contained in row 646 of the fact table. Each of these two facts relates to actions that have been performed by a user that have action ID 3. The fact contained in row 643 of the fact table corresponds to the information in the intersection of row 101 of FIG. 1 with column 114. It can be seen that, in row 643 of the fact table, the contents of a local user ID column 651 indicate the local user ID of 0 corresponding to the "ned@hotmail.com" user; the contents of an action ID field 652 identified the action ID as 3, corresponding to the "perform shopping checkout" action; the contents of the time column 653 identified the date Apr. 1, 2005; and the contents of a count column 654 indicate that that user performed that action one time on that date. It can be seen that the facts contained in row 643 of the fact table may also be accessed via fact pointer 632 in the list of fact pointers pointed to by an element 611 of user index array 610 corresponding to the "ned@hotmail.com" user who has local user ID 0. When the facility receives a new action in step 301, and determines a local user ID and an action ID for that action, it uses one of the two indices to determine whether the fact table already contains a fact for this action. In some embodiments, the facility, accesses both the fact pointer list for the action's action ID and the fact pointer list for the action's local user ID, and traverses the fact pointer list of these two that contains fewer fact pointers. In some embodiments, the facility uses a different basis for choosing one of these two fact pointer lists, such as always selecting the fact pointer list for the local user ID if the total number of users is expected to be larger than the total number of action types. If the facility locates a fact in the fact table corresponding to the received action, the facility updates the row of the fact table to reflect the received action. For example, if the facility determined that the sample action discussed above in connection with FIGS. 4 and 5 corresponded to the facts shown in row 643 of the fact table, the facility may increment the count of this row of the fact table from 1 to 2. If the facility does not locate a fact in the fact table corresponding to the received action, the facility augments the representation by adding a new fact to the fact table representing the received action. As part of this process, the facility adds fact pointers to the new fact to the index on each index dimension, here user identity and action type.

In some embodiments, the facility enables a user to configure the granularity of the times attributed to the facts in the fact table. As part of configuring the granularity, a user may choose both the duration of individual time values and the starting and stopping time. For example, FIG. 6 shows times established in accordance with a granularity of one day, beginning at 12:00 a.m. on that day and ending at 11:59 p.m. on that day. By choosing a longer duration for time granularity, the user can reduce the amount of space required to store encoded versions of action times in the representation.

In some embodiments, in order to match a fact, the action's local user ID, action ID, and time must all match those contained by the fact. For example, an action that had local user ID 0, action ID 3, and time Apr. 2, 2005 would not match the fact contained in row 643 in these embodiments, as row 643 reflects a different time. In these embodiments, the facility would create a new fact in the fact table containing these values and initialize its count to 1. When creating a new fact, the facility updates the indices by adding a fact pointer to that fact to both the fact pointer list for the fact's action ID and the fact pointer list for the fact's local user ID.

In some embodiments, the facility maintains in the fact table only the most recent fact for a particular user and action type. For example, in the case of the example discussed in the foregoing paragraph, rather than creating a new fact containing the time Apr. 2, 2005, the facility would change the time in row 643 to Apr. 12, 2005, in routine account 1 corresponding to the single Apr. 2, 2005 action of this type that has been performed by this user.

In some embodiments, the fact table further includes a deleted column 655. Alternatively, a bitmap 655 is maintained in parallel with the fact table. The contents of this column or bitmap indicate whether a row has been deleted. For example, the value in this column/bitmap for row 642 indicates that this row has been deleted. Accordingly, its contents are no longer current. In some embodiments, the facility may reuse this row of the fact table for a new fact. In other embodiments, new rows are exclusively appended to the end of the fact table, and deleted rows are not reused.

In some embodiments, the facility builds the fact table as a large table stored in permanent storage, such as on a hard disk, comprised of "chunks" of a size likely to fit into a storage device having faster write and retrieval times, such as random access memory. This enables the facility to do fast processing on a chunk while it is in memory, then page that chunk out to disk in order to do fast processing on another chunk. In some embodiments, the facility stores the entire fact table in random access memory.

In some embodiments, rather than maintaining a fact table separate from the list of fact pointers to contain fact information, the fact information is stored directly in the lists of fact pointers.

Figure 7:
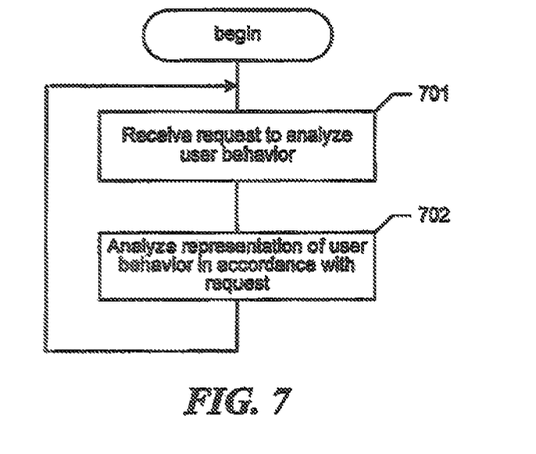
FIG. 7 is a flow diagram showing steps typically performed by the facility in order to analyze user behavior information.

FIG. 7 is a flow diagram showing steps typically performed by the facility in order to analyze user behavior information. In Step 701, the facility receives a request to analyze user behavior. For example, a facility may receive a request to analyze the behavior of a particular user or group of users, or a request to analyze the performance of one or more particular actions by users. In step 702, the facility analyzes the representation of user behavior discussed above in accordance with the request received in step 701. For example, the facility may aggregate facts in the fact table relating to the request, or perform other analysis or selection based upon these facts. In some embodiments, the facility analyzes the representation in order to populate segments of users having particular interests, such as for advertising purchases, as is described in more detail in U.S. patent application Ser. No. 11/073,016, filed on Mar. 4, 2005, which is hereby incorporated by reference in its entirety. After step 702, the facility continues to step 701 to receive the next request for analysis.

While the table and data structure diagrams discussed below show table or data structure contents and organization in a way designed to make them more comprehensible by a human reader, those skilled in the art will appreciate that actual structures used by the facility to store this information may differ from those shown, in that they, for example, may be organized in a different manner; may contain more or less information than shown; may be compressed and/or encrypted; etc.

It will be appreciated by those skilled in the art that the above-described facility may be straightforwardly adapted or extended in various ways. For example, the facility may be used to analyze a wide variety of kinds of user behavior, including web browsing behavior, television or other video-watching behavior, radio or other audio-listening behavior, reading behavior, etc. The facility may store a variety of information about user actions as part of the facts that it creates. The facility may maintain indices on a different set of fact dimensions, as well as a different number of fad dimensions. While the foregoing description makes reference to particular embodiments, the scope of the invention is defined solely by the claims that follow and the elements recited therein.

We claim:

1. A method in a computing system for analyzing user behavior information, comprising:
   receiving a stream of user behavior information;
   augmenting a representation of user behavior in accordance with the received stream of user behavior information, the representation comprising a sparse matrix of elements, each element containing information indicating a user behavior fact, wherein a recurring time period is indicated in connection with the representation, wherein each element of the sparse matrix identifies an instance of the recurring time period to which the user behavior fact indicated by the information contained by the element relates, and wherein each element of the sparse matrix indicates a number of times a particular user performed an action of a particular type during the identified instance of the recurring time period; and
   analyzing the sparse matrix to obtain an analysis result for the stream of user behavior.

2. The method of claim 1 wherein the analyzing comprises traversing a first dimension of the sparse matrix representation at a selected position in a second dimension of the sparse matrix representation to analyze user behavior facts relating to a selected value in the second dimension that corresponds to the selected position in the second dimension.

3. The method of claim 1 wherein a first dimension of the sparse matrix corresponds to user identity and a second dimension of the sparse matrix corresponds to action type, the method further comprising receiving a request for analysis,
   wherein the analyzing is performed upon receiving the request for analysis.

4. The method of claim 1 wherein the received stream of user behavior information reflects web browsing behavior.

5. The method of claim 1 wherein the received stream of user behavior information reflects television viewing behavior.

6. The method of claim 1 wherein the received stream of user behavior information reflects audio listening behavior.

7. The method of claim 1 wherein the received stream of user behavior information reflects online product purchasing behavior.

8. The method of claim 1 wherein the received stream of user behavior information reflects online behavior.

9. A computer-readable medium whose contents cause a computing system to perform a method for analyzing user behavior information, the method comprising:
   receiving a stream of user behavior information;
   augmenting a representation of user behavior in accordance with the received stream of user behavior information, the representation comprising a sparse matrix of elements, each element containing information indicating a user behavior fact, wherein a recurring time period is indicated in connection with the representation, wherein each element of the sparse matrix identifies an instance of the recurring time period to which the user behavior fact indicated by the information contained by the element relates, and wherein each element of the sparse matrix indicates a number of times a particular user performed an action of a particular type during the identified instance of the recurring time period; and
   analyzing the sparse matrix to obtain an analysis result for the stream of user behavior.

10. The computer-readable medium of claim 9 wherein the analyzing comprises traversing a first dimension of the sparse matrix representation at a selected position in a second dimension of the sparse matrix representation to analyze user behavior facts relating to a selected value in the second dimension that corresponds to the selected position in the second dimension.

11. The computer-readable medium of claim 9 wherein the entirety of the augmented representation of user behavior resides in volatile memory of a single computer system during the analysis.

12. The computer-readable medium of claim 9 wherein the received stream of user behavior information reflects web browsing behavior.

13. The computer-readable medium of claim 9 wherein the received stream of user behavior information reflects television viewing behavior.

14. The computer-readable medium of claim 9 wherein the received stream of user behavior information reflects audio listening behavior.

15. The computer-readable medium of claim 9 wherein the received stream of user behavior information reflects online product purchasing behavior.

16. The computer-readable medium of claim 9 wherein the received stream of user behavior information reflects online behavior.

17. One or more computer memories collectively storing a user behavior data structure, the data structure comprising a sparse matrix of elements, each element containing information indicating a user behavior fact, wherein a recurring time period is indicated in connection with the user behavior data structure, wherein each element of the sparse matrix identifies an instance of the recurring time period to which the user behavior fact indicated by the information contained by the element relates, and wherein each element of the sparse matrix indicates a number of times a particular user performed an action of a particular type during the identified instance of the recurring time period.

18. The computer memories of claim 17 wherein the sparse matrix has at least two dimensions, including a first dimension for user identity and a second dimension for action type.

19. The computer memories of claim 17 wherein, for each element of the sparse matrix, the particular user is identified by a position in a first dimension of the matrix occupied by the element, and the particular action type is identified by a position in a second dimension of the matrix occupied by the element.

20. The computer memories of claim 17 wherein the entirety of the user behavior data structure resides in volatile memory of a single computer system.

* * * * *